United States Patent [19]

Preus

[11] 4,045,962
[45] Sept. 6, 1977

[54] CABLE CONNECTOR ASSEMBLY FOR OIL CONTAINMENT BOOM

[76] Inventor: Paul Preus, 21 Smith Road, Toms River, N.J. 08753

[21] Appl. No.: 702,066

[22] Filed: July 2, 1976

[51] Int. Cl.² .............................................. E02B 15/04
[52] U.S. Cl. ...................................................... 61/1 F
[58] Field of Search ........................... 61/1 F; 248/66; 256/13.1; 403/79, 157

[56] References Cited

U.S. PATENT DOCUMENTS

| | | | |
|---|---|---|---|
| 3,377,053 | 4/1968 | Burdett et al. | 256/13.1 |
| 3,499,290 | 3/1970 | Smith | 61/1 F |
| 3,592,008 | 7/1971 | Trindle | 61/1 F |
| 3,868,824 | 3/1975 | Thurman | 61/1 F |

Primary Examiner—Paul R. Gilliam
Assistant Examiner—David H. Corbin
Attorney, Agent, or Firm—Harold L. Stowell

[57] ABSTRACT

A barrier for water carried pollutants consists of a series of end-to-end connected boom sections with each boom section including a tubular sleeve portion containing flotation means and a depending skirt. The entire series of boom sections are connected to one or a pair of flexible draft members which are connected to the booms at spaced points by connector assemblies comprising this invention.

2 Claims, 2 Drawing Figures

CABLE CONNECTOR ASSEMBLY FOR OIL CONTAINMENT BOOM

CROSS-REFERENCE TO RELATED APPLICATIONS

Related subject matter is disclosed and claimed in my co-pending applications, Ser. No. 676,795 filed Apr. 14, 1976 and Ser. No. 676,794 filed Apr. 14, 1976.

BACKGROUND OF THE INVENTION

Field of the Invention

Floating barriers, known generally as oil booms, have been found to have great utility in containing and controlling oil slicks on bodies of water. The barriers usually include flotation elements having a depending liquid impervious skirt which, when deployed around or in a controlling position relative to oil floating on water, provide means to contain or prevent the oil from spreading or moving into areas protected by the barrier.

Present art barriers generally utilize either a solid material as the flotation medium or gas inflatable flotation elements.

it is also known, as disclosed in my co-pending application Ser. No. 683,189 filed May 4, 1976 to provide control wires, chains or the like on either one or both sides of the oil boom to maintain the integrity of the boom and to provide means whereby the configuration of the boom may be maintained by connecting to the control wires additional cables, chains or the like, which additional cables or chains may be connected to other booms, the shore, a wreck, a boat or boats, or to sea or bottom anchors or any combination thereof.

SUMMARY OF THE INVENTION

This invention may be generally defined as a barrier for water carried pollutants comprising a series of end-to-end connectable boom sections, each boom section comprising a flexible tubular sleeve containing flotation means and a depending skirt, flexible draft members extending along each side of the skirt immediately below the tubular sleeve and means connecting the flexible draft member to the boom at spaced intervals characterized in that the connecting means comprise a pair of U-shaped anchor shackles adapted to receive a threaded anchor pin at the extended ends of the legs thereof, a boss on the bridge portion of each shackle having an opening therein the axis of which lies in a plane parallel to the longitudinal axes of the legs of each of the U-shaped shackles, internal threads in the openings in each boss, a connector bar having threads at both ends compatable with threads in the pair of bosses and openings through the skirt of the boom to snugly receive the connector bar.

The invention will become more apparent to those skilled in the art by reference to the following detailed description when viewed in light of the accompanying drawing.

DETAILED DESCRIPTION OF PREFERRED EMBODIMENT

Figure 1:
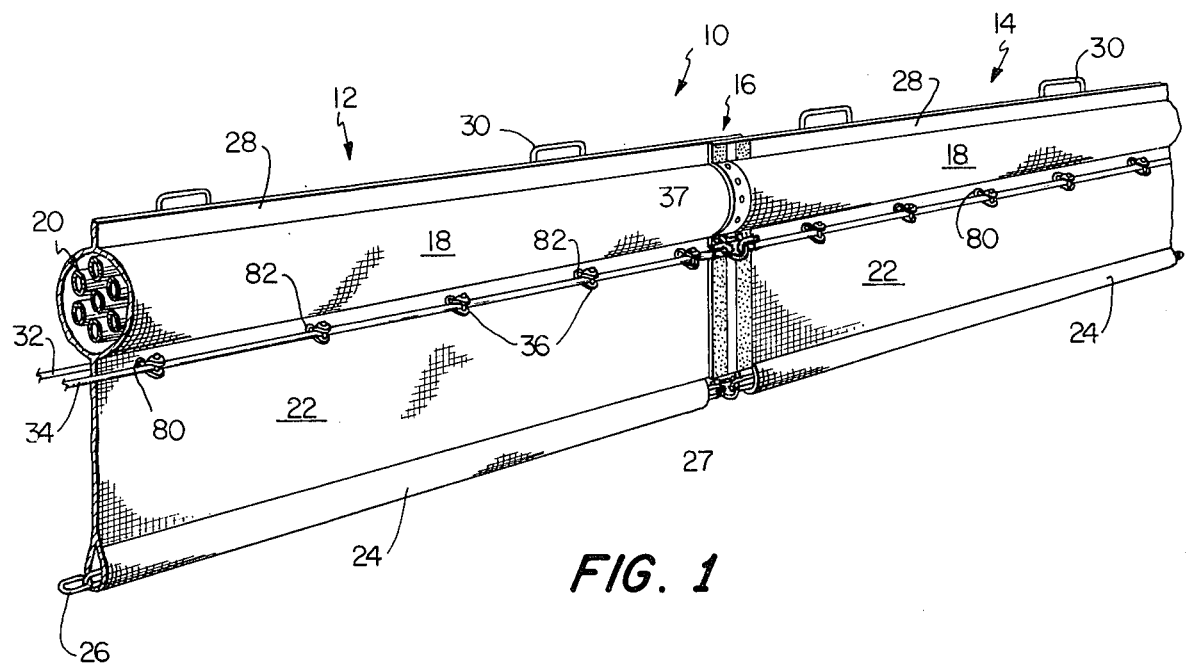
FIG. 1 is a fragmentary perspective view of an oil boom embodying the principles of the present invention.

Referring to the drawing, 10 generally designates an oil containing boom of the type adapted to surround an oil spill or the like floating on the surface of a body of water. The containment boom may also be stretched across all or a portion of rivers, streams and the like or connected down current of a submerged or partially submerged vessel having oil or other floating contaminants issuing therefrom, all as is known in the art.

The boom 10, illustrated in FIG. 1 of the drawing, comprises two boom sections 12 and 14 interconnected at a joint generally designated 16. Each boom section 12 and 14 includes a tubular portion 18 containing flotation means which in the illustrated form of the invention comprises seven air-inflatable elongated tubes generally designated 20 of the type disclosed in my application Ser. No. 676,795 filed Apr. 14, 1976. Depending from the tubular portions 18 are skirt members 22 and at the lower end of each skirt is a longitudinal pocket 24 containing a ballast chain 26 connected at each joint 16 by connector 27. Each of the booms 12 and 14 may also include an upstanding fin 28 and spaced along the fin 28 are a plurality of handles 30, which handles assist in deploying and retrieving the boom sections. Further, the handles are very useful in storing the boom sections as the handles may be merely slipped over pegs spaced at least a pair of handles distance or multiples thereof. The handles have also been found to be helpful in cleaning the boom sections prior to reuse as the handles may be hung over hooks movably positioned over a scrub tank.

Each tubular sleeve portion 18 may have a length of, for example, 50 feet and a diameter of, for example, 8 inches. However, the boom sections may have lengths of from 2 feet to 100 feet and diameters in the range of from 6 inches to as much as 36 inches, for example. The tubular sleeve and the skirt may be constructed of, for example, nylon reinforced PVC sheet material, nylon reinforced oil-resistant rubber, fabric and the like.

The assembly also includes a pair of flexible draft members 32 and 34 strung along each side of the skirt members 22 just below the tubular portions 18. The flexible draft members are maintained in the desired position by improved connectors generally designated 36.

The connectors 36 will be described in detail in reference to FIG. 2 of the drawing. The function of the cables is to maintain the integrity of the pollutant control booms and, as such, the cables should have tensile strengths in the order of from about 4 to 80,000 pounds. Preferably the flexible draft members 32 and 34 are provided in lengths of, for example, 25 to 50 feet and the ends of such cable lengths are connected by separable fasteners 37 having strength at least equivalent to the tensile strength of the cables themselves. Providing the pair of cables in such lengths, speeds deployment and retrieval of the boom and also permits the cables to be opened for insertion of or removal of one or more boom sections to either enlarge or decrease the area of containment or to replace a damaged boom section.

In addition to maintaining the integrity of the containment boom, the cables are useful as attaching points for control cables and/or anchor lines as attachment to such cables puts a minimum of stress on the fabric of the boom.

From the foregoing description, it will be apparent to those skilled in the art that, if the cables or flexible draft members 32 and 34 are to perform their intended function, the means 36 connecting the cables to the boom must have provision of removal and insertion of the cables and provide for fluid-tight connection to the boom skirts. These conditions are ably met by the connectors 36 shown in FIG. 2 of the drawing.

Figure 2:
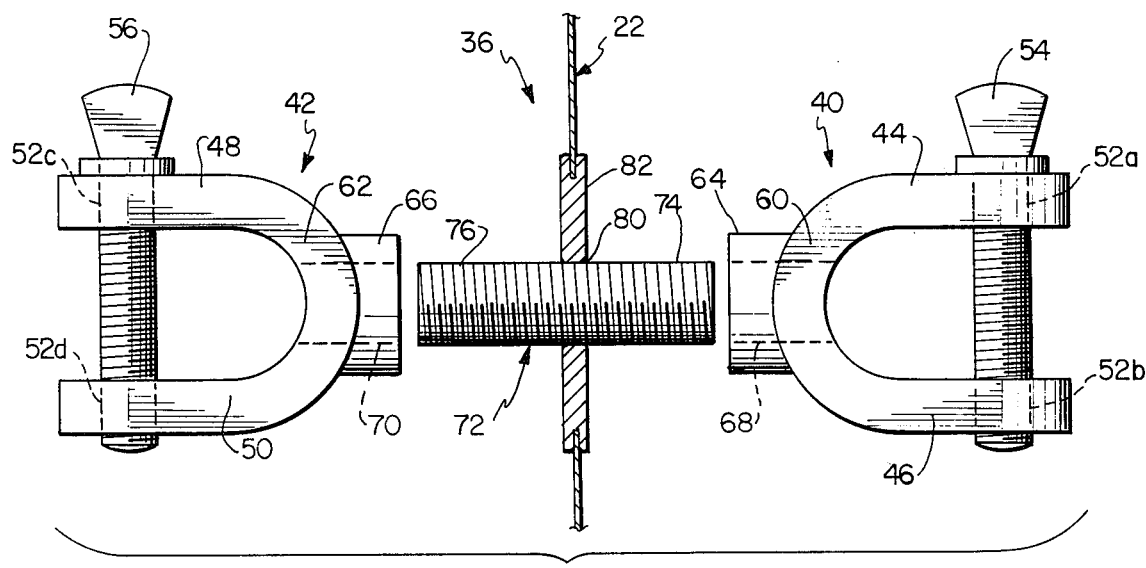
FIG. 2 is an enlarged plan view of the connector of the invention.

Referring particularly to FIG. 2, each of the connectors 36 of the invention comprises a pair of generally U-shaped anchor shackles 40 and 42. The legs 44 and 46 of shackles 40 and 48 and 50 of shackle 42 are bored at the extended ends thereof and threaded as at 52a, 52b, 52c and 52d respectively. The threaded bores receive a threaded anchor shackle pin 54 for shackle 40 and 56 for shackle 42.

The external surface of bridge portion 60 of shackle 40 and 62 of shackle 42 is formed wih or has attached thereto a boss 64 and 66 respectively. In one form of the invention, the bosses 64 and 66 comprise threaded nuts which are welded to the bridge portions 60 and 62. Bosses 64 and 66 are bored and tapped as at 68 and 70 for shackles 40 and 42 respectively. The assembly is completed by a connector bar generally designated 72 having threads throughout its length or at least at each end 74 and 76, which threads are compatable with the internal threads 68 and 70 of bosses 64 and 66.

In an exemplary form of the invention, the shackles 40 and 42 are ⅜ inch stainless steel and the connector bar is of equivalent diameter and constructed of equivalent material.

Spaced at intervals along the upper marginal edge of the skirts 22 are openings 80, which openings are sized to snugly receive the connector bars 72. Preferably, in order to insure a fluid-tight connection between the openings 80 in the skirts 22 and the connector bars 72, the openings in the skirts 22 are provided with resilient grommets 82.

The number of anchor connectors employed in the boom may vary from a spacing of one every 2 feet to about one every 10 to 15 feet.

What has been set forth is intended as exemplary to enable those skilled in the art to practice the invention and what is new and therefore desired to be protected by Letters Patent of the United States is.

I claim:

1. A barrier for water carried pollutants comprising a series of end-to-end connectable boom sections, each boom section comprising a flexible tubular sleeve containing flotation means and a depending skirt, flexible draft members extending along each side of the skirt immediately below the tubular sleeve and means connecting the flexible draft members to the boom at spaced intervals characterized in that the connecting means comprises a pair of U-shaped anchor shackles, adapted to receive a threaded anchor pin at the extended ends of the legs thereof, a boss on the bridge portion of each shackle having an opening therein, the axis of which lies in a plane parallel to the longitudinal axes of the legs of each of the U-shaped shackles, internal threads in the openings in each boss, a connector bar having threads at both ends compatible with threads in the pair of bosses and openings through the skirt of the boom to snugly receive the connector bar.

2. The invention defined in claim 1 wherein resilient grommets are provided in each of the openings through the skirt portions of the boom.

* * * * *